W. W. LOWER.
PUNCTURE PROOF TIRE.
APPLICATION FILED JUNE 24, 1911.

1,010,061.

Patented Nov. 28, 1911.

Witnesses

Inventor
W. W. Lower,
By Geo. L. Beeler
Attorney

UNITED STATES PATENT OFFICE.

WILLIAM W. LOWER, OF TYRONE, PENNSYLVANIA.

PUNCTURE-PROOF TIRE.

1,010,061.   Specification of Letters Patent.   Patented Nov. 28, 1911.

Application filed June 24, 1911. Serial No. 635,173.

*To all whom it may concern:*

Be it known that I, WILLIAM W. LOWER, a citizen of the United States, and a resident of Tyrone, in the county of Blair and State of Pennsylvania, have invented a new and useful Improvement in Puncture-Proof Tires, of which the following is a specification.

This invention relates to tires for cycles, automobiles, and other vehicles, and especially to that type of resilient tires which are not intended to be inflated, and yet which are not only resilient but are also reliable and durable.

A tire made in accordance with this invention is intended to have all of the advantages of an ordinary pneumatic tire, but without the attendant dangers of punctures, blow-outs, and the like, all of which is hereinafter described and claimed and illustrated in the accompanying drawings, in which—

Figure 1:
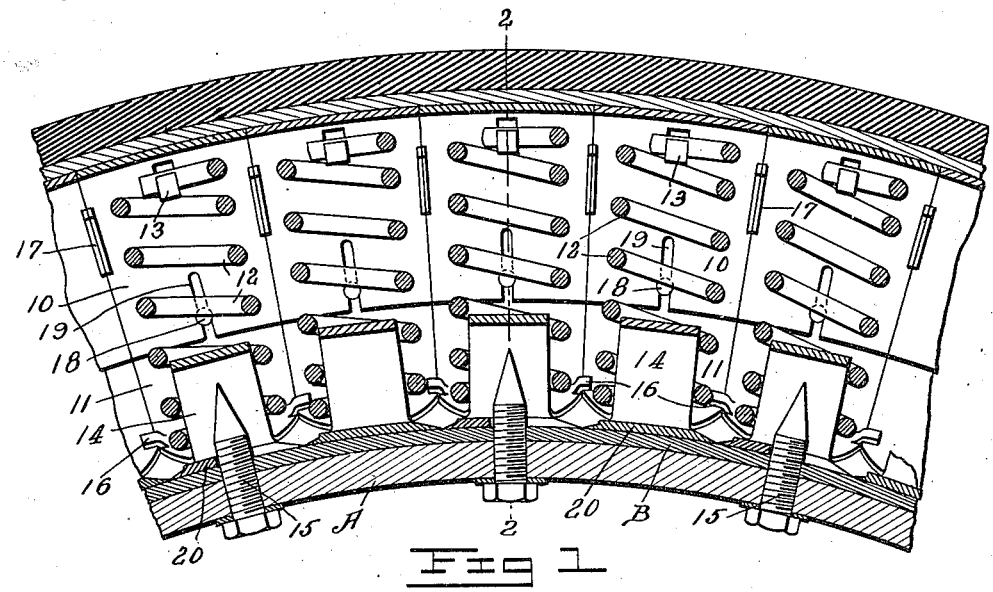
Figure 2:
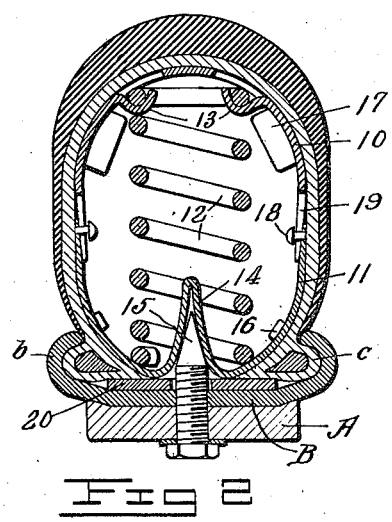
Figure 3:
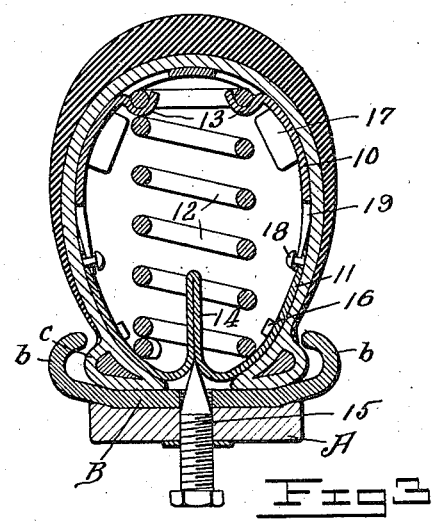

Figure 1 is a vertical longitudinal section or portion of a tire; Fig. 2 is a vertical transverse section on the line 2—2 of Fig. 1, and Fig. 3 is a like view showing the parts in process of assemblage, the wedges not being in place.

Throughout the following description and on the several figures of the drawings similar parts are referred to by like reference characters.

At A is indicated any conventional form of wheel felly, having a metallic rim B whose lateral edges are formed into flanges *b* in the usual manner.

The improved tire comprises a casing made of any suitable tough or fibrous material and having clenchers *c* adapted to engage under the aforesaid rim flanges. Within the casing are arranged a circumferential series of pairs of metallic U-shaped plates 10 and 11, each pair extending from the outer portion of the casing inwardly toward or against the rim, and the plate 10 being movable toward or away from the other plate. Any suitable form or construction of cushioning means may be interposed between said plates for the purpose of resisting said inward movement of the outer plates and to maintain thereby the tire or casing in distended position. Said cushioning means are illustrated as being in the form of a coil spring 12 between each pair of plates 10 and 11, of sufficient strength to maintain the proper form of the tire under ordinary conditions of service. The spring is preferably permanently attached at its outer end to the plate 10, as by means of clips or ears 13 struck from said plate and made to embrace the outer coil of the spring. The plate 11 is formed with a V-shaped portion 14, which extends outward toward the opposing section 10 and forms a positive means for retaining the inner end of the spring, embraced thereby, from displacement.

The plate is made of spring material, the normal form of which is indicated in Fig. 3, whereby the casing with the series of cushioning devices therein may be placed upon the rim, after which the casing flanges *c* may be made to forcibly engage under the rim flanges. In order to effect this latter process I show a series of conical pointed screws 15, as many as may be required for the purpose, tapped through the aforesaid rim and felly, the point of each screw being caused thereby to enter the V of the adjacent plate 11 causing it to spread, as indicated in Fig. 2, and forcing the casing flanges snugly into clenched position. If the number of screws employed be less than the number of plates 11 certain of the plates 11 may be provided with lugs or lips 16 which, engaging over the edges of the adjacent plates, will cause the latter to spread simultaneously with the spreading of the plates directly engaged by the screws. In order to prevent the sections 10 from creeping one over another or otherwise becoming displaced there may be provided on the adjacent edges thereof sets of lugs 17 adapted to abut against each other and yet permit the desired freedom of independent radial movement of the plates 10.

The various parts of the device may be made of any suitable materials and the proportionate sizes and dimensions may be varied as may be considered best, without departing from the spirit of the invention hereinafter claimed.

In order to assist in keeping the sections 10 and 11 in proper relative position it may be desirable to employ rivets or studs 18 in one section operating in slots 19 in the other section. I also show a series of plates or wedges 20 which may be fitted under the sections 11, as one means which may be employed to assist in tightening the tire on the rim. As many of these wedges as may be required may be slipped or driven beneath the springs 11, certain of the wedges being notched so as to straddle the screws 15.

Having thus described a preferred embodiment of the invention, what I claim and desire to secure by Letters Patent of the United States is:

1. The combination with a wheel felly and rim having clencher flanges, of a tire comprising a resilient casing adapted to interlock beneath said rim flanges, a circumferential series of pairs of plates within the casing, the plates of each pair being radially disposed, cushioning means interposed between the plates of each pair, tending to maintain the casing in distended position, and means operable through the rim to cause the inner plates to spread laterally to interlock the casing with the rim flanges.

2. In a cushioning device for a vehicle tire, the combination of a pair of coöperating curved plates, a spring interposed between the plates and tending to force them apart, the inner plate having a V-shaped portion extending outwardly toward the other plate and serving to prevent the displacement of the spring, and means serving to spread the inner plate at the V and to secure said cushioning means in position.

3. The combination with a wheel rim, of a casing, a pair of plates within the casing, a spring between the plates, the inner plate having a V-shaped portion extending outwardly toward the outer plate, the spring being secured at its outer end to the outer plate and embracing said V-shaped portion at its inner end, and means operable through said rim serving to secure said casing and plates in position.

In testimony whereof I have hereunto affixed my signature in the presence of two subscribing witnesses.

WILLIAM W. LOWER.

Witnesses:
ELMER CRAWFORD,
W. H. FLENNER.